(12) United States Patent
O'Brien et al.

(10) Patent No.: US 9,077,732 B2
(45) Date of Patent: Jul. 7, 2015

(54) SYSTEM AND METHOD FOR SELECTIVE DISTRIBUTION OF INFORMATION

(75) Inventors: Mike F. O'Brien, Bellevue, WA (US); William J. Strain, Bellevue, WA (US); Patrick J. Wyatt, Bellevue, WA (US)

(73) Assignee: ARENANET, LLC, Bellevue, WA (US)

( * ) Notice: Subject to any disclaimer, the term of this patent is extended or adjusted under 35 U.S.C. 154(b) by 0 days.

(21) Appl. No.: 13/295,229

(22) Filed: Nov. 14, 2011

(65) Prior Publication Data

US 2012/0058827 A1   Mar. 8, 2012

Related U.S. Application Data

(63) Continuation of application No. 11/406,448, filed on Apr. 18, 2006, now Pat. No. 8,075,403.

(60) Provisional application No. 60/675,624, filed on Apr. 28, 2005.

(51) Int. Cl.
*A63F 13/12* (2006.01)
*A63F 13/30* (2014.01)
*H04L 29/06* (2006.01)
*H04L 29/08* (2006.01)

(52) U.S. Cl.
CPC ............ *H04L 67/1095* (2013.01); *A63F 13/12* (2013.01); *H04L 67/38* (2013.01); *A63F 2300/402* (2013.01); *A63F 2300/53* (2013.01)

(58) Field of Classification Search
USPC ......................................................... 463/42
See application file for complete search history.

(56) References Cited

U.S. PATENT DOCUMENTS

| | | | |
|---|---|---|---|
| 5,929,864 A | 7/1999 | Picott et al. | |
| 6,625,813 B1 | 9/2003 | Gibbs | |
| 6,767,287 B1* | 7/2004 | Mcquaid et al. | 463/42 |
| 6,931,412 B2 | 8/2005 | Uyttendaele et al. | |
| 7,050,955 B1* | 5/2006 | Carmel et al. | 703/6 |
| 7,366,775 B2 | 4/2008 | Taylor | |
| 2003/0177187 A1 | 9/2003 | Levine et al. | |
| 2004/0053690 A1 | 3/2004 | Fogel et al. | |
| 2004/0143852 A1 | 7/2004 | Meyers | |
| 2006/0242157 A1 | 10/2006 | McCuller | |
| 2009/0198824 A1* | 8/2009 | Taylor | 709/230 |

OTHER PUBLICATIONS

Mitchell, A. et al., "The Use of Computer and Video Games for Learning: A Review of the Literature," ULTRALAB, Learning and Skills Development Agency, 2004, 93 pages.
International Search Report mailed Oct. 19, 2007 for PCT/US06/14448, 2 pages.

\* cited by examiner

*Primary Examiner* — Damon Pierce
*Assistant Examiner* — Jeffrey Wong
(74) *Attorney, Agent, or Firm* — Banner & Witcoff, Ltd.

(57) ABSTRACT

A system and method for selectively updating remote devices is described herein. A method incorporating at least some of the present teachings may include, for example, receiving a communication from a client application executing on a remote device. The communication may indicate a condition of a game character being played in a massively multi-party online game. The method may also include developing a filtered manifest that includes a list of files needed by the client application and associated with the condition. A portion of the collection may be identified for communication to the client application, and communication of the portion may be initiated.

20 Claims, 3 Drawing Sheets

SYSTEM AND METHOD FOR SELECTIVE DISTRIBUTION OF INFORMATION

CROSS-REFERENCE TO RELATED APPLICATION(S)

The present application is a continuation of U.S. application Ser. No. 11/406,448, filed Apr. 18, 2006, entitled "SYSTEM AND METHOD FOR SELECTIVE DISTRIBUTION OF INFORMATION," which claims priority from U.S. provisional patent application No. 60/675,624, filed Apr. 28, 2005, entitled "SYSTEM AND METHOD FOR SELECTIVE DISTRIBUTION OF INFORMATION," both of which are assigned to the current assignee hereof and incorporated herein by reference in their entirety.

FIELD OF THE DISCLOSURE

The present disclosure relates generally to online gaming and more particularly to a system and method for selective distribution of information.

BACKGROUND

The genre of Massively Multiplayer Online Games (MMOGs) is becoming increasingly popular. Many users genuinely enjoy the idea of playing such games with and against thousands of other users. The users also tend to appreciate the "escape" aspect of many MMOGs. Game developers spend countless hours creating huge online worlds with never before seen levels of interactivity and detail.

While online worlds that allow users to escape are popular, these games tend to be extraordinarily complex. There are several challenges associated with creating and balancing a virtual society for thousands of players. And, the challenges do not stop once the game is developed. Once developed, many of the games still need to be actively managed.

While a great deal of time is spent making games better, larger, and more detailed, too little time is spent addressing the challenges associated with actually managing the playing of the games (e.g., distributing, running, supporting, and updating the MMOGs).

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on distributing updates and/or other information in connection with operating a MMOG. While the teachings may certainly be utilized in this application, the teachings may also be utilized in other applications and with several different types of architectures such as distributed computing architectures, client/server architectures, or middleware server architectures.

In the gaming context, a technique incorporating at least some of the present teachings may include, for example, receiving a communication from a client application executing on a remote device. The communication may indicate a condition of a game character being played in a massively multiparty online game (MMOG). The method may also include developing a filtered manifest that includes a list of files needed by the client application and associated with the condition. A portion of the collection may be identified for communication to the client application, and communication of the portion may be initiated.

In one embodiment, the information to be communicated may include a geometry file, a texture file, a sound file, and an animation file. The files may be associated with some specific condition of the character such as a current character location, a predicted character location, and/or a character interaction. In practice, a process of identifying which files are needed by a remote user may be facilitated by the maintaining of a dependency graph that maps a plurality of game elements and/or locations with associated geometry files, texture files, sound files, and animation files. In a specific implementation, the dependency graph may be a directed acyclic graph (DAG).

Figure 1:
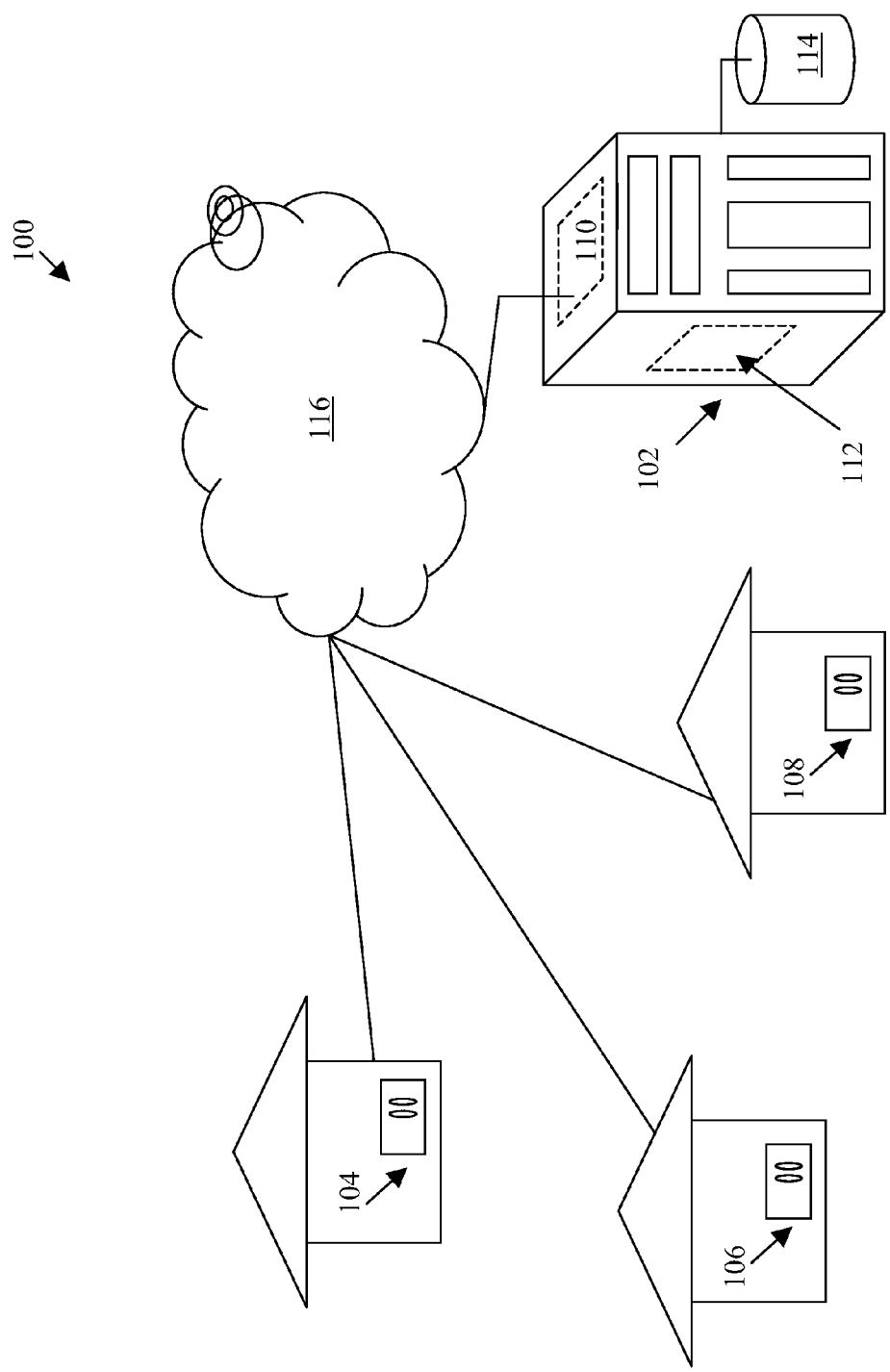
FIG. 1 depicts a system that selectively distributes information in accordance with teachings of the present disclosure.

As indicated above, FIG. 1 depicts a system 100 that selectively distributes information in accordance with the teachings disclosed herein. As shown, a computing platform 102 is configured to serve an online game to several remote clients executing on remote computing devices (represented at computers 104, 106, and 108). In the depicted embodiment of system 100, an interface 110 is associated with computing platform 102 and is configured to receive an update signal from one or more of the remote clients. As shown, platform 102 may also include an update engine 112 responsive to a received update signal. The update signal may be, for example, an explicit request for updates. The update signal may also be a communication indicating a situation (e.g., a condition of a game character) that is interpreted and/or recognized as indicating a need for updates.

In operation, update engine 112 may be communicatively coupled to a data store 114 maintaining information implicated during the playing of a MMOG. For example, a user at computer 104 may be playing a character in a game served by platform 102. The user's character may be transitioning from one part of an online world to another part. A communication indicating this transition may represent the update signal and may cue update engine 112 that additional information is or may be needed by the user at computer 104.

If computer 104 does not have the information it needs to support the character's transition to a new part of the online world, this shortcoming may be recognized and the necessary information may be sent to computer 104. In practice, update engine 112 may access at least a partial listing of available information for the given MMOG being played, may select a portion of the available information for outputting, and may initiate an outputting of the portion to computer 104.

Depending upon implementation detail, update engine 112 may be at least partially implemented by a processor and a computer readable medium maintaining instructions operable to direct the processor to recognize the update signal, to access the partial listing, to select the portion, and to initiate the outputting. In a particular embodiment, the process of selecting the portion for outputting may include a filtering process. Such a process could involve, for example, communicating a portion of a directed acrylic graph (DAG) to computer 104. The portion could be the part of a larger DAG that is associated with a condition of a character played by the user at computer 104. The filtering process may also involve receiving a communication from computer 104 indicating at least one file from the DAG that user needs. In practice, the files actually needed by computer 104 may be identified by considering a list of relevant information and pruning the list to remove an entry already stored at computer 104.

For example, files associated with a given tree in the online world may be used in more than one part of the world (e.g., the "same" tree may be in the background of several different scenes). As a result, even if update engine 112 "knows" that a character is transitioning to a new area and that the new area includes a certain tree, update engine 112 may not "know" that computer 104 already has files associated with the tree because the same tree appeared in an earlier scene. To reduce unnecessary downloads, computer 104 may help update engine 112 by pruning a list of needed files and/or actually developing the list of needed files.

As described above, several modern day MMOGs present users with a very detailed and large virtual world. In practice, some portion of the virtual world may be originally downloaded to a user across wide area network 116. The original download may include files sufficient to allow character play in an initial part of a virtual world. The original download could also be a kernel that is insufficient on its own to allow character play. Such a kernel may instead facilitate subsequent downloading of the information necessary to play.

In practice, for complete world downloading to work effectively, the virtual world may need to be relatively small. To produce a virtual world small enough to download, developers may need to take some short cuts like replacing hand-painted texture maps with procedural ones, using more procedural models, reducing the number of sound effects, and/or animating cut-scenes on the fly.

In some cases, these changes may reduce the perceived quality of the game. To maintain quality, some developers may instead elect to distribute at least a portion of a game client on a purchased compact disc (CD) or Digital Video Disc (DVD). Utilizing a CD or DVD may allow a developer to originally communicate larger amounts of information. However, given the texture maps, 3D models, sounds effects, recorded speech, etc., of modern MMOGs, it can be difficult and/or cost prohibitive to include enough CDs to completely represent a large virtual world.

As such, a system like the one depicted in system 100 may be utilized to enhance the ability of developers to dynamically update a game by adding new content, altering client-side code, removing existing content, and/or changing content. Utilizing system 100, these updates may occur across communication links as opposed to or in addition to the distribution of new CDs.

As shown in system 100, a remote computer like computer 104 may be communicatively coupled to platform 102 at least partially across a wide area network 116, which may be for example the Public Internet. In operation, a network session may be established to facilitate communication between the client executing at computer 104 and computing platform 102. Establishing the session may involve one or more network protocols such as PPP, TCP/IP, UDP/IP, etc. However established, a communication path between computer 104 and computing platform 102 may allow for a streaming of information. In some embodiments, such a path will be capable of communicating information identified by the filtering process described above while simultaneously serving the online game to computer 104. In other embodiments, the filtered information may be communicated outside of an active gaming link. Whether update information is communicated inside and/or outside a time period in which a user is playing, a game designer may want to utilize a dependency graph such as a directed acyclic graph (DAG) to help identify files to be downloaded.

Figure 2:
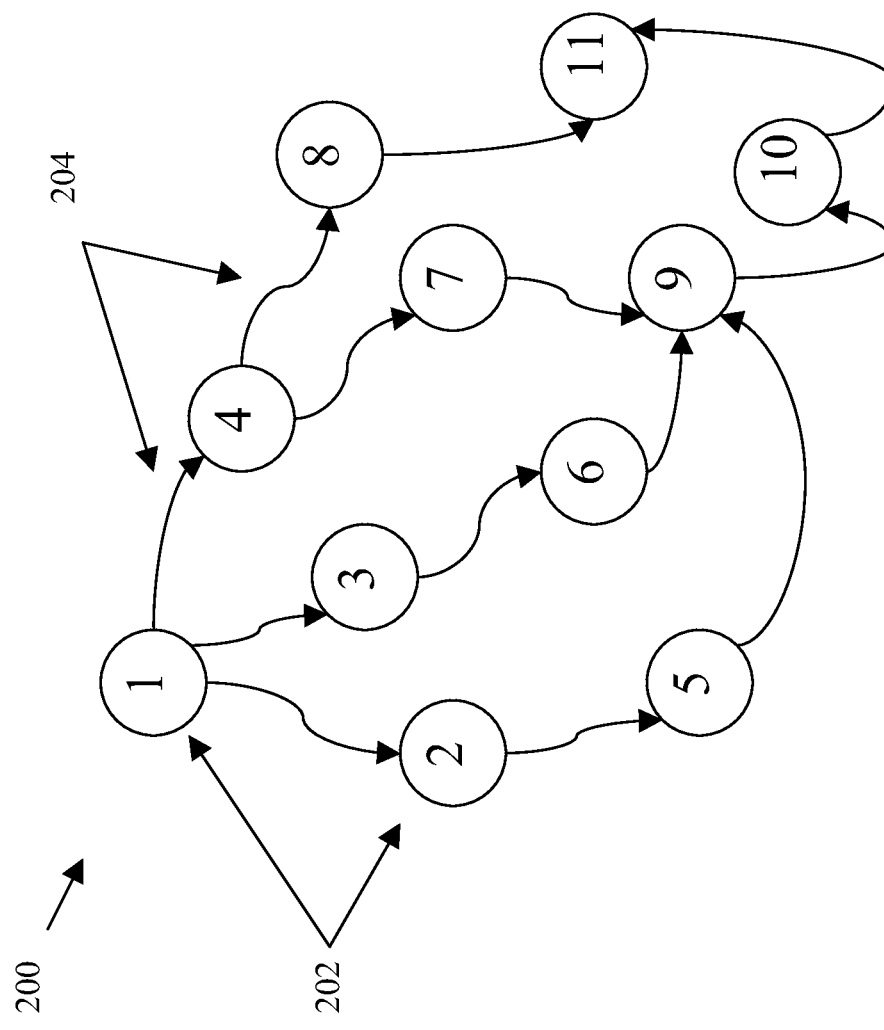
FIG. 2 shows a simplified depiction of a directed acyclic graph that represents various programming elements and their interrelationship in a manner that incorporates at least a portion of the present teachings.

As indicated above in the Brief Description of the Drawings, FIG. 2 shows a simplified depiction of a directed acyclic graph 200 that represents various programming elements and their interrelationship in a manner that incorporates at least a portion of the present teachings. As shown, DAG 200 holds a portion of an object representation of a virtual world model.

DAG 200 represents a directed graph with no cycles. DAG 200 may be part tree and part graph and may include several program elements at its nodes, which are indicated generally at 202. DAG 200 may help a game developer in several ways. Problems such as download scheduling and critical path analysis, for example, may be simplified using a DAG. This can become increasingly important in the context of determining what information needs to be downloaded to a user in order to allow the user to take advantage of a "new" part of an online world. DAGs may help select to-be-downloaded information by virtue of, for example, a DAG's ability to be topologically sorted using a depth-first search.

As shown DAG 200 is being used to represent a set of program files whose necessity is dependent on one or more other program files. The programs are represented generally at nodes 202 in the graph, and the links represented generally at 204 identify dependencies between the programs. In practice, a mechanism such as update engine 112 of FIG. 1 may consider DAG 200 when determining what information needs to be downloaded to a client. The identified information may then be submitted for download. While there may be several possible variations, exemplary data structures for DAG 200 could include adjacency matrices and adjacency lists.

In accordance with the teachings disclosed herein, node 1 of DAG 200 may represent a root node for a virtual world, and nodes 2, 3, and 4, may represent different parts of that world. For example, nodes 2, 3, and 4, may include several different files such as texture files, animation files, audio files, etc. necessary to represent respective parts of the world. Working down a level in DAG 200, node 5 may represent a specific scene making up the part of the virtual world represented by node 2. And, node 6 may represent a specific scene making up the part of the virtual world represented by node 3.

As shown, the part of the world represented by node 4 may include two scenes represented by nodes 7 and 8. In practice, nodes 7 and 8 may contain files that present a lighted version of a scene and a darkened version of the same scene, respectively. In one embodiment, a game developer may want to update the game by adding a few new elements to the world. The new elements may be represented, for example, by nodes 9, 10, and 11. Node 9 may be a texture file for a forest, node 10 may be an animation file for the trees and the leaves in the forest, and node 11 may be an audio file that sounds like wind blowing through the forest.

As a player's character moves through the world, the character may be approaching the darkened version (node 8) of the above referenced scene. A remote server supporting the game and serving it to the player may recognize that the character approaches the scene represented in node 8 and elect to download the file of node 11 so that the player's character will hear the sound of wind blowing through the blacked out forest. Because the player's character "approached" the updated portion of the virtual world through node 8—a darkened world—the server "knew" that the player only needed the files of node 11 as opposed to all of the new files contained in nodes 9, 10, and 11.

As such, the server effectively trickles updates to the player as the player needs the updates—allowing for a just-in-time type of online updating. If the player's character later approaches the scene represented by node 6, the server may recognize that the client program used by the player now needs all of the new files contained in nodes 9, 10, and 11. In some cases, the server may generate a manifest of files for download, and the manifest may include the files of nodes 9, 10, and 11. The manifest may then be pruned or filtered to determine if the client actually needs all the files. As indicated above, if the player has already received the files of node 11, those files may be removed from the manifest, and the size of the download will become smaller. This technique of thoughtful downloading may provide a more efficient approach to updating and/or initially downloading portions of a MMOG.

Figure 3:
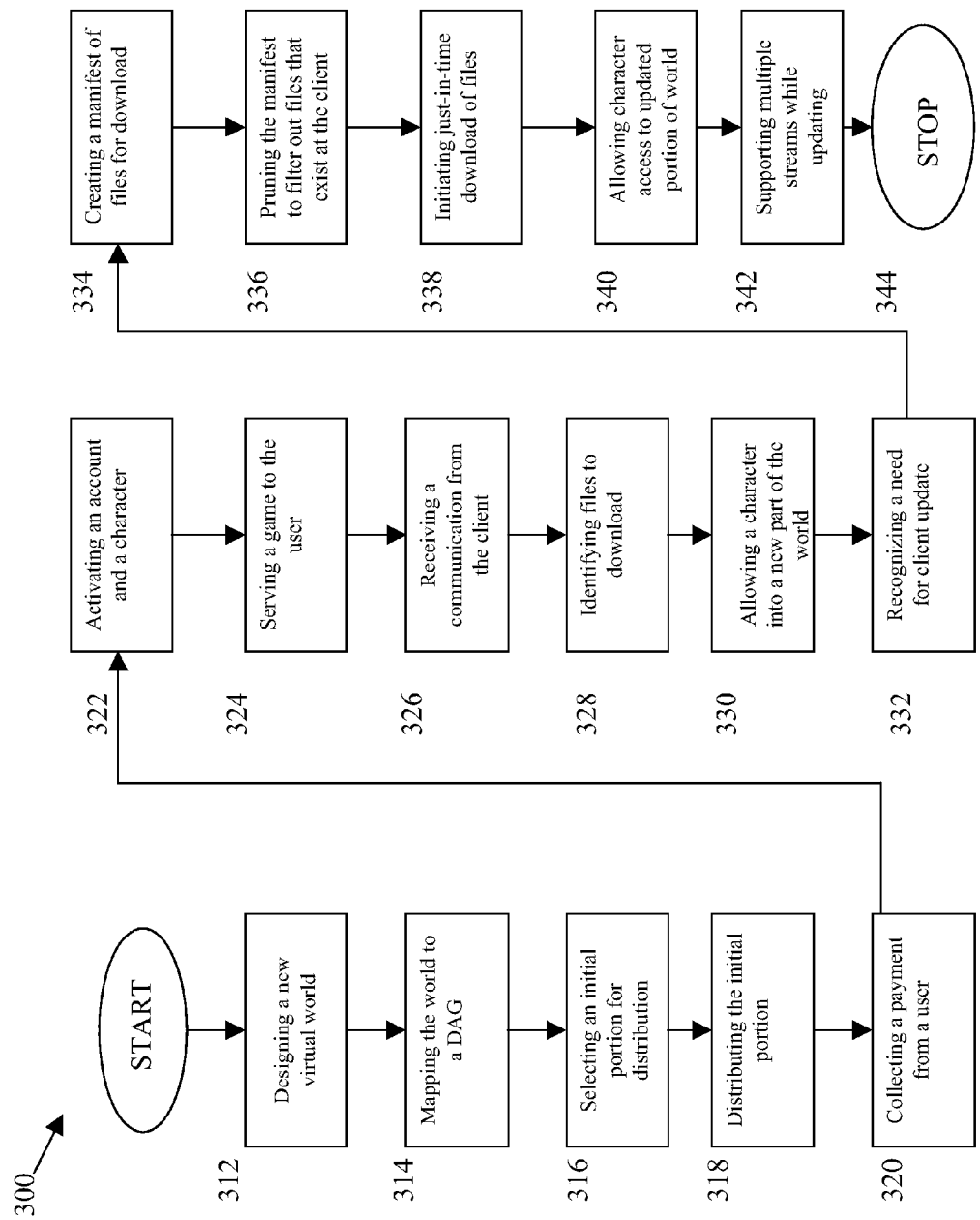
FIG. 3 presents a flow diagram for a selective distribution technique that incorporates at least some of the present teachings.

As indicated above in the Brief Description of the Drawings, FIG. 3 presents a flow diagram for a selective distribution technique 300 that incorporates at least some of the present teachings. At step 312, a game developer may begin the process of designing a new virtual world. The new world may be the backdrop for a new MMOG that the developer hopes to market to thousands of online gamers.

In practice, the MMOG and/or the world acting as a backdrop for the MMOG may be "converted" at step 314 into a DAG representation, where each node may represent a basic block of code. Each basic block or node may include a code listing that terminates at some ending point after starting at some other point. Each edge or link may represent a relationship or next action taken if so indicated at the ending point of a given node.

At step 316, an initial portion of the world may be selected for distribution, and at step 318 the initial portion may be distributed. In practice, the initial portion may be distributed via online download, as a disk offered for sale at a retailer, as a disk freely distributed, and/or some other appropriate distribution mechanism. However distributed, a user intending to play the game may receive the initial portion and load it on his or her computer. The initial portion may establish a client application at the user's computer and facilitate the user's ability to begin playing the new game.

At step 320, a payment from the user may be collected for the initial portion and/or for the service of serving the game to the user. At step 322, the user's account may be activated, and the user may establish a character to play the new game. At step 324, a remote computing platform may serve the game to the user. Though the game may be served to the user from a remote device, the act of playing the game may also make use of computing resources local to the user. For example, a client executing at the user's computer may support a significant portion of the computing load associated with the user's playing of the MMOG.

At step 326, a communication may be received that indicates that the user's client needs an update and/or additional files to more completely experience the game. Files to be downloaded to the client may be identified at step 328. The process of identifying these files may involve, for example, a consideration of a DAG that represents some portion of the MMOG. However identified, the files may be downloaded to the client at a later time, in near real-time, on a just-in-time basis, and/or in some other fashion. At step 330, the files may have been downloaded such that the user's character is able to experience the elements that were represented in the files.

At step 332, it may be determined that the user's client needs to be updated. At step 324, a manifest of new files needed by the client may be created. Again, a DAG may be considered to assist in the creation of the manifest. Depending upon implementation detail, the user's computer may be tasked with considering the DAG to help develop the manifest and/or a computing platform remote from the user may be tasked with this process. At step 336, the manifest may be filtered against a list of files that are already on the user's computer. If a file is already resident on the user's computer, the file may be pruned from the manifest to avoid its unnecessary downloading. As with the original manifest, the user's computer may be tasked with the pruning process and/or a computing platform remote from the user may be tasked with this process.

At step 338, the files needed by the user's client may be downloaded, and at step 340 the user's character may be capable of experiencing the updated game portions. At step 342, a remote computing platform may be serving the game to thousands of users while simultaneously assisting in the process of providing update files and/or other additional files. The process may proceed to stop at step 344.

Though technique 300 has been described in a series of sequential steps, the sequence of the steps and the party performing the steps may be freely changed without departing from the scope of the teachings. Steps may be added, deleted, and/or altered in several ways. Similarly, the steps may re-ordered and/or looped.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for selectively distributing game content to a plurality of remote devices, the method comprising:
   determining an in-game-world attribute, trait or condition of a game character controlled through a remote device;
   developing a filtered manifest identifying content items needed by a client application associated with the game character based on the in-game-world attribute, trait or condition, the identified content items being a subset of content items available to be communicated, wherein different filtered manifests are developed for different in-game-world attributes, traits or conditions of the game character;
   communicating content items identified by the filtered manifest to the remote device, excluding any content items identified as already resident at the remote device;
   determining an updated in-game-world attribute, trait or condition of the game character; and
   repeating the steps of developing a filtered manifest and communicating content items based on the updated in-game-world attribute, trait or condition, wherein the filtered manifest developed based on updated in-game-world attribute, trait or condition is different from the filtered manifest developed based on the previous in-game-world attribute, trait or condition.

2. The method of claim 1, wherein the content items are for use in a plurality of game sessions subsequent to communicating the content items to the remote device.

3. The method of claim 1, wherein determining the in-game-world attribute, trait or condition of the game character includes determining a position of the game character in a game world.

4. The method of claim 3, further comprising developing another filtered manifest identifying content items for another game character based on a position of the other game character in the game world.

5. The method of claim 1, wherein developing the filtered manifest comprises determining the content items identified by the filtered manifest based on a set of content items already resident at the remote device.

6. The method of claim 1, wherein developing the filtered manifest comprises determining the filtered manifest based on dependencies between the content items identified by the filtered manifest.

7. An apparatus comprising:
   a processor; and
   memory storing computer readable instructions that, when executed by the processor, cause the apparatus to:
      determine an in-game-world attribute, trait or condition of a game character controlled through a remote device;
      develop a filtered manifest identifying content items needed by a client application associated with the game character based on the in-game-world attribute, trait or condition, the identified content items being a subset of content items available to be communicated, wherein different filtered manifests are developed for different in-game-world attributes, traits or conditions of the game character;
      communicate content items identified by the filtered manifest to the remote device, excluding any content items identified as already resident at the remote device;
      determine an updated in-game-world attribute, trait or condition of the game character; and
      repeat the steps of developing a filtered manifest and communicating content items based on the updated in-game-world attribute, trait or condition, wherein the filtered manifest developed based on updated in-game-world attribute, trait or condition is different from the filtered manifest developed based on the previous in-game-world attribute, trait or condition.

8. The apparatus of claim 7, wherein the filtered manifest includes a first set of content items and a second set of content items, and wherein developing the filtered manifest includes determining that the second set of content items are prerequisites to the first set of content items.

9. The apparatus of claim 8, wherein determining the second set of content items is performed based on dependency information indicating dependencies between the first set of content items and the second set of content items.

10. The apparatus of claim 7, wherein the instructions, when executed, further cause the apparatus to develop the filtered manifest by identifying content items already resident at the remote device.

11. The apparatus of claim 10, wherein the instructions, when executed, further cause the apparatus to develop another filtered manifest identifying content items by identifying content items already resident at another remote device.

12. The apparatus of claim 7, wherein the in-game-world attribute, trait or condition results from a user's interactions with an online game world in which the game character exists.

13. The apparatus of claim 7, wherein the instructions, when executed, further cause the apparatus to determine another filtered manifest identifying content items to be communicated to another remote device, wherein the filtered manifest identifies a first image file and the other filtered manifest identifies a second image file different from the first image file.

14. The apparatus of claim 7, wherein the instructions, when executed, further cause the apparatus to determine another filtered manifest identifying content items to be communicated to another remote device, wherein the filtered manifest identifies a first audio file and the other filtered manifest identifies a second audio file different from the first audio file.

15. A non-transitory computer-readable medium storing instructions that, when executed by a processor, cause a computing device to:
   determine an in-game-world attribute, trait or condition of a game character controlled through a remote device;
   develop a filtered manifest identifying content items needed by a client application associated with the game character based on the in-game-world attribute, trait or condition, the identified content items being a subset of content items available to be communicated, wherein different filtered manifests are developed for different in-game-world attributes, traits or conditions of the game character;
   communicate content items identified by the filtered manifest to the remote device, excluding any content items identified as already resident at the remote device;
   determine an updated in-game-world attribute, trait or condition of the game character; and
   repeat the steps of developing a filtered manifest and communicating content items based on the updated in-game-world attribute, trait or condition, wherein the filtered manifest developed based on updated in-game-world attribute, trait or condition is different from the filtered manifest developed based on the previous in-game-world attribute, trait or condition.

16. The computer-readable medium of claim 15, wherein the filtered manifest identifying content items includes a first set of content items and a second set of content items, and wherein developing the filtered manifest includes determining that the second set of content items are prerequisites to the first set of content items.

17. The computer-readable medium of claim 16, wherein determining the second set of content items comprise instructions to determine the second set of content items based on dependency information indicating dependencies between the first set of content items and the second set of content items.

18. The computer-readable medium of claim 15, wherein the set of instructions further comprise instructions to determine the content items identified by the filtered manifest by identifying content items already resident at the remote device.

19. The computer-readable medium of claim 15, wherein the instructions further comprise instructions to develop another filtered manifest identifying content items to be communicated to another remote device by identifying content items already resident at the other remote device.

20. The computer-readable medium of claim 15, wherein the instructions further comprise instructions to determine the content items identified by the filtered manifest based on a user's interactions with an online game world in which the game character exists.

* * * * *